United States Patent
Chaiken

(10) Patent No.: US 11,194,684 B2
(45) Date of Patent: Dec. 7, 2021

(54) INFORMATION HANDLING SYSTEM AND METHODS TO DETECT POWER RAIL FAILURES AND TEST OTHER COMPONENTS OF A SYSTEM MOTHERBOARD

(71) Applicant: DELL PRODUCTS L.P., Round Rock, TX (US)

(72) Inventor: Craig L. Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 16/250,541

(22) Filed: Jan. 17, 2019

(65) Prior Publication Data

US 2020/0233766 A1 Jul. 23, 2020

(51) Int. Cl.
G06F 11/22 (2006.01)
G06F 1/30 (2006.01)
G06F 8/65 (2018.01)
G06F 9/4401 (2018.01)

(52) U.S. Cl.
CPC ............ *G06F 11/2284* (2013.01); *G06F 1/30* (2013.01); *G06F 8/65* (2013.01); *G06F 9/4401* (2013.01); *G06F 11/2205* (2013.01)

(58) Field of Classification Search
CPC .... G06F 11/2284; G06F 11/2205; G06F 1/30; G06F 9/4401; G06F 8/65
See application file for complete search history.

(56) References Cited

U.S. PATENT DOCUMENTS

| | | | |
|---|---|---|---|
| 7,391,184 B2 | 6/2008 | Luo et al. | |
| 7,595,609 B2 | 9/2009 | Wang et al. | |
| 7,804,672 B2 | 9/2010 | Tonry et al. | |
| 8,129,946 B2 | 3/2012 | Wang et al. | |
| 8,129,947 B2 | 3/2012 | Chiasson et al. | |
| 8,154,255 B2 | 4/2012 | Wang et al. | |
| 2002/0196048 A1 | 12/2002 | Sunter | |
| 2009/0034141 A1* | 2/2009 | Tonry | G06F 1/305 361/92 |
| 2010/0204946 A1* | 8/2010 | Warren | G01R 31/40 702/108 |

(Continued)

*Primary Examiner* — Bryce P Bonzo
*Assistant Examiner* — Michael Xu
(74) *Attorney, Agent, or Firm* — Egan Enders & Huston LLP.

(57) ABSTRACT

Embodiments of information handling systems (IHSs) and methods are provided herein to automatically detect failure(s) on one or more power rails provided on a system motherboard of an IHS. One embodiment of such a method may include determining if a power rail test should be performed each time an information handling system (IHS) is powered on or rebooted. If a power rail test is performed, the method may perform a current measurement for each of the power rails separately to obtain actual current values for each power rail, compare the actual current values obtained for each power rail to expected current values stored for each power rail, and detect a failure on at least one of the power rails if the actual current value obtained for the at least one power rail differs from the expected current value stored for the at least one power rail by more than a predetermined percentage or amount.

18 Claims, 8 Drawing Sheets

(56) References Cited

U.S. PATENT DOCUMENTS

| | | | |
|---|---|---|---|
| 2010/0277142 A1* | 11/2010 | Tan | H02M 7/53803 |
| | | | 323/268 |
| 2014/0218011 A1* | 8/2014 | Nabhane | G06F 1/3287 |
| | | | 324/113 |
| 2016/0033611 A1* | 2/2016 | Rahardjo | G01R 35/005 |
| | | | 702/104 |
| 2019/0086982 A1* | 3/2019 | Priyadarshi | G06F 1/3206 |
| 2020/0099222 A1* | 3/2020 | Parmar | H02J 1/14 |

* cited by examiner

INFORMATION HANDLING SYSTEM AND METHODS TO DETECT POWER RAIL FAILURES AND TEST OTHER COMPONENTS OF A SYSTEM MOTHERBOARD

FIELD

This invention relates generally to information handling systems (IHSs), and more particularly, to IHS components and related methods for detecting power rail failures and testing other system motherboard components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling systems (IHS) is initially powered on or rebooted, operating voltages are supplied to various information handling system components in a particular order or "power sequence." Once a power rail coupled to a processing device within the IHS reaches a sufficient operating voltage, the processing device accesses boot firmware stored in non-volatile memory, via a chipset, stores a copy of the boot firmware in system memory and executes the boot firmware to implement a boot process for the IHS. Typically, the processing device executes the boot firmware to configure hardware components of the IHS, perform a Power-On Self-Test (POST) to ensure the hardware configuration is valid and working properly, discover and initialize devices, and launch a bootloader to load an OS into system memory.

In some cases, an information handling system may fail to complete the POST, or may fail to power on completely. When a no power/no POST failure occurs, the IHS may be sent to a service center for diagnostics and/or repair, resulting in end user down time and service and/or repair costs. Unfortunately, there are many different root causes for a no power/no POST failure, each with its own solution or repair, making it difficult to determine if the system motherboard should be replaced or repaired. For example, a no power/no POST failure may occur when the chipset is stuck in a failure state or when the non-volatile memory storing the boot firmware is in an unbootable state. One known repair solution to recover from these types of no power/no POST failures is to remove or simulate removal of a battery powering the system clock. In other cases, however, a no power/no POST failure may be caused by a failure on one or more power rails provided on the system motherboard. When a power rail failure occurs, the system motherboard must be replaced.

SUMMARY OF THE INVENTION

The following description of various embodiments of information handling systems and related methods is not to be construed in any way as limiting the subject matter of the appended claims.

According to various embodiments of the present disclosure, improved information handling systems and methods are provided herein to automatically detect failure(s) on one or more power rails provided on a system motherboard of an IHS when the IHS is powered on or rebooted. Providing a mechanism for automatically detecting power rail failures enables these failures to be distinguished from other types of no power/no POST failures, and provides a more reliable means to determine if the system motherboard should be replaced, or if another solution could be used to recover from a no power/no POST failure. Embodiments of the systems and methods disclosed herein may be used to detect failures on primary power rails, as well as subordinate power rails coupled to the primary power rails, without the need for dedicated test circuits on the power rails. In addition to testing power rails, systems and methods are provided herein for testing other components on, and/or functionality of, the system motherboard without the need for dedicated test circuits or human intervention.

According to one embodiment, an information handling system (IHS) is provided herein including a battery charger and power circuit, which is configured to generate operating voltages supplied on a plurality of power rails to IHS components, and an embedded controller (EC), which is configured to execute program instructions when the IHS is powered on or rebooted to determine if a power rail test should be performed. In some embodiments, the embedded controller may determine that a power rail test should be performed if a boot failure occurs. In other embodiments, the embedded controller may determine that a power rail test should be performed if a hotkey (e.g., a power rail test hotkey) is depressed. In some embodiments, the hotkey may be held down while another button (e.g., the power button) is pressed to initiate a power rail test.

If the embedded controller determines that a power rail test should be performed, the embedded controller may be configured to execute program instructions to: perform a current measurement for each of the power rails separately to obtain actual current values for each power rail; compare the actual current values obtained for each power rail to expected current values stored for each power rail; and detect a failure on at least one of the power rails if the actual current value obtained for the at least one power rail differs from the expected current value stored for the at least one power rail by more than a predetermined percentage or amount.

In some embodiments, the IHS may include a battery charger integrated circuit (IC), which is coupled to the battery charger and power circuit. The battery charger IC may be configured to measure current associated with one or more of the power rails and report the current measurement to the embedded controller as a current value.

If a failure is detected on the at least one power rail, the embedded controller may execute program instructions to store one or more details of the at least one power rail in a non-volatile memory of the IHS. In some embodiments, the one or more details may include a power rail number of the at least one power rail (i.e., the failed power rail or rails). In other embodiments, the one or more details may also include one or more of the following: the expected current value for the at least one power rail, the actual current value for the at least one power rail, and a timestamp identifying when the actual current value was obtained for the at least one power rail.

In some embodiments, the embedded controller may execute additional program instructions prior to determining if a power rail test should be performed. For example, the embedded controller may execute program instructions to perform a current measurement for each of the power rails separately to update the expected current values stored for each power rail if a current measurement flag is set. In some embodiments, the current measurement flag may be set upon exiting a BIOS manufacturing mode, detecting a hardware configuration change, restoring BIOS setup default settings, or performing a firmware update for an IHS component.

The embedded controller may also execute program instructions to perform the current measurement needed to obtain actual current values for each power rail, or to update the expected current values stored for each power rail. For example, the embedded controller may execute program instructions to: generate a numbered list of the power rails; receive a first current from a current sensor coupled to the power rails, wherein the first current is received when only a power rail supplied to the embedded controller is enabled; store a power rail number of a power rail in the numbered list; enable the power rail corresponding to the stored power rail number; receive a second current from the current sensor when only the power rail supplied to the embedded controller and the power rail corresponding to the stored power rail number are enabled; store a difference between the second current and the first current in a non-volatile memory of the IHS, wherein the difference corresponds to the actual current value or the expected current value for the power rail; disable the power rail; and repeat the steps of receiving a first current, storing a power rail number, enabling the power rail, receiving a second current, storing a difference and disabling the power rail for each power rail remaining in the numbered list.

According to another embodiment, a method is provided herein for automatically detecting a failure on one or more primary power rails provided on a system motherboard of an information handling system (IHS). In some embodiments, the disclosed method may be performed by an embedded controller (or another processing device) of the IHS, and may be used to detect failure(s) on one or more primary power rails without the need for dedicated test circuits on the power rails.

In some embodiments, the method may begin by determining if a power rail test should be performed each time an information handling system (IHS) is powered on or rebooted. In some embodiments, the method may determine that a power rail test should be performed if a boot failure occurs. In other embodiments, the method may determine that a power rail test should be performed if a hotkey (e.g., a power rail test hotkey) is depressed. In some embodiments, the hotkey may be held down while another button (e.g., the power button) is pressed to initiate a power rail test.

If the power rail test is performed, the method may further include performing a current measurement for each of the power rails separately to obtain actual current values for each power rail, comparing the actual current values obtained for each power rail to expected current values stored for each power rail, and detecting a failure on at least one of the power rails if the actual current value obtained for the at least one power rail differs from the expected current value stored for the at least one power rail by more than a predetermined percentage or amount. If a failure is detected on the at least one power rail, the method may further include storing one or more details of the at least one power rail, such as but not limited to, a power rail number of the at least one power rail, the expected current value for the at least one power rail, the actual current value for the at least one power rail, and/or a timestamp identifying when the actual current value was obtained for the at least one power rail.

In some embodiments, additional method steps may be performed prior to determining if a power rail test should be performed. For example, the method may include performing a current measurement for each of the power rails separately to update the expected current values stored for each power rail if a current measurement flag is set. In some embodiments, the method may include setting the current measurement flag upon exiting a BIOS manufacturing mode, detecting a hardware configuration change, restoring BIOS setup default settings, or performing a firmware update for an IHS component.

In some embodiments, additional method steps may be performed to obtain the actual current values for each power rail, or to update the expected current values stored for each power rail. For example, the method may include generating a numbered list of the power rails; receiving a first current from a current sensor coupled to the power rails, wherein the first current is received when only a power rail supplied to an embedded controller of the IHS is enabled; storing a power rail number of a power rail in the numbered list; enabling the power rail corresponding to the stored power rail number; receiving a second current from the current sensor when only the power rail supplied to the embedded controller and the power rail corresponding to the stored power rail number are enabled; storing a difference between the second current and the first current in non-volatile memory, wherein the difference corresponds to the actual current value or the expected current value for the power rail; disabling the power rail; and repeating the steps of receiving a first current, storing a power rail number, enabling the power rail, receiving a second current, storing a difference and disabling the power rail for each power rail remaining in the numbered list.

According to another embodiment, a method is provided herein for automatically detecting a failure on one or more subordinate power rails, which are coupled to a primary power rail. In some embodiments, the disclosed method may be performed by an embedded controller (or another processing device) of the IHS, and may be used to detect a failure on a subordinate power rail without the need for dedicated test circuits on the power rails or storing expected and/or actual current values for the subordinate power rails.

In some embodiments, the method may include enabling a primary power rail, waiting for the current on the primary power rail to stabilize, and receiving a first current from a current sensor coupled to the primary power rail. Next, the method may include enabling a first subordinate power rail coupled to the primary power rail, waiting for the current to stabilize, and receiving a second current from the current sensor corresponding to the current on the primary power rail and the subordinate power rail. In some cases, the method may detect a failure on the subordinate power rail if the second current is less than the first current. After disabling the subordinate power rail, the method may determine if there are any more subordinate power rails coupled to the primary power rail, and if so, the above-mentioned steps may be repeated for the next subordinate power rail, until none remain.

According to yet another embodiment, a method is provided herein for testing a component on, or a functionality of, a system motherboard of an information handling system (IHS). In some embodiments, the disclosed method may be performed by an embedded controller (or another processing device) of the IHS, and may be used to test whether or not the system motherboard component or function is working properly without the need for dedicated test circuits or human intervention.

In some embodiments, the method may include receiving a first current value from a battery charger integrated circuit (IC), enabling the system motherboard component or function, and receiving a second current value from the battery charger IC. In some embodiments, said enabling the system motherboard component or function may include turning on or activating a light emitting diode (LED), a keyboard backlight, a speaker beep, a power rail under test, or a built-in self-test (BIST) for a display screen. In some cases, the method may report successful operation of the system motherboard component or function if the second current value differs from the first current value. In other cases, the method may report a failure for the system motherboard component or function if the second current value does not differ from the first current value.

In some embodiments, additional method steps may be performed prior to receiving the first current from the battery charger IC. For example, the method may include adjusting a current detected by a current sensor, which is coupled to one or more power rails provided on a system motherboard of an information handling system (IHS), until the detected current almost reaches, but does not surpass, the next current value that can be reported by a battery charger integrated circuit (IC) coupled to the current sensor. In some embodiments, the current may be adjusted by enabling a power rail supplied to a display screen of the IHS; turning on a backlight panel for the display screen; receiving a current value from the battery charger IC; adjusting the current supplied to the power rail to increase a brightness level of the backlight panel until the next current value is received from the battery charger IC; and adjusting the current supplied to the power rail to decrease the brightness level of the backlight panel by one step, so that the current detected by the current sensor almost reaches, but does not surpass, the next current value.

BRIEF DESCRIPTION OF THE DRAWINGS

Other advantages of the present disclosure will become apparent upon reading the following detailed description and upon reference to the accompanying drawings in which.

Figure 1:
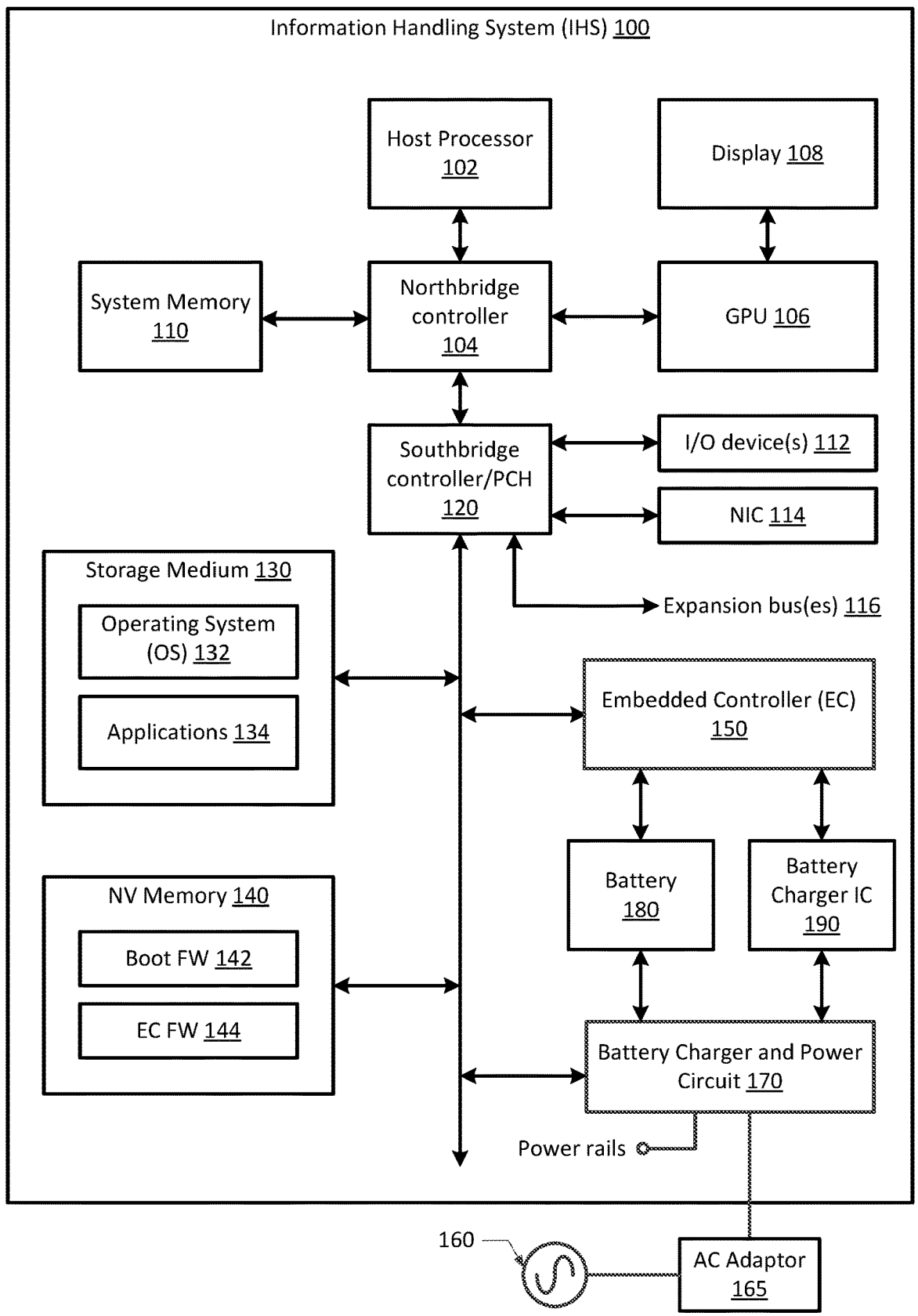
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Returning to the embodiment shown in FIG. 1, information handling system (IHS) 100 may generally include a least one host processor 102, a northbridge controller 104, a graphics processor unit (GPU) 106, a display device 108, a system memory 110, one or more input/output (I/O) device(s) 112, a network interface card (NIC) 114, expansion bus(es) 116, a southbridge controller 120, a computer readable storage medium 130, a computer readable non-volatile (NV) memory 140, an embedded controller (EC) 150, a battery charger and power circuit 170, a rechargeable battery 180 and a battery charger integrated circuit (IC) 190. It is noted that, while certain components of an information handling system are shown in FIG. 1 for illustrating embodiments of the present disclosure, the information handling system disclosed herein is not restricted to including only those components shown in FIG. 1 and described below.

Host processor 102 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 102 may include at least one central processing unit (CPU) having one or more processing cores. The CPU may include any type of processing device, such as an Intel Pentium series processor, an Advanced Micro Devices (AMD) processor or another processing device. In some embodiments, host processor 102 may include other types of processing devices including, but not limited to, a graphics-derivative processor (such as a physics/gaming processor), a digital signal processor (DSP), etc.

Northbridge controller 104 is coupled to host processor 102 and configured to coordinate communication between host processor 102 and one or more IHS components. In the embodiment shown in FIG. 1, northbridge controller 104 is further coupled to GPU 106 and system memory 110. Although illustrated as a separate component in FIG. 1, northbridge controller 104 may alternatively be integrated into host processor 102, for example, when host processor 102 is implemented as a silicon-on-chip (SoC) processor.

GPU 106 is coupled to northbridge controller 104 and configured to coordinate communication between the host processor and one or more display components of the IHS. In the embodiment shown in FIG. 1, GPU 106 is coupled to display device 108 to provide visual images to the user. In some embodiments, GPU 106 may be additionally coupled to one or more display ports to support additional display functions. Although GPU 106 is illustrated as a separate integrated circuit chip, GPU 106 may be integrated with host processor 102 when the host processor is implemented as a silicon-on-chip (SoC) processor.

Display device 108 may be a display screen embedded within a chassis of IHS 100, or an external display screen or monitor coupled to the IHS. In one embodiment, display device 108 may be a liquid crystal display (LCD) device including a backlight panel, a layer of liquid crystal molecules sandwiched between two transparent electrode layers and one or more polarizing filters. The backlight panel may include a light source, which provides illumination to a display surface or display screen of the display device. In some embodiments, a brightness level of the backlight panel may be increased or decreased by adjusting a current supplied to the backlight panel.

System memory 110 is coupled to northbridge controller 104 and configured to store program instructions, which are executable by host processor 102. System memory 110 may be implemented using any suitable memory technology, including but not limited to, random access memory (RAM), read only memory (ROM), dynamic RAM (DRAM), synchronous DRAM (SDRAM), and other suitable storage mediums.

In some embodiments, southbridge controller 120 may be coupled to northbridge controller 104 via an internal bus. In other embodiments, southbridge controller 120 may be replaced by a platform controller hub (PCH) and connected directly to host processor 102 via a direct media interface (DMI). Southbridge controller/PCH 120 (otherwise referred to as a "chipset") handles I/O operations for the IHS, and thus, may include a variety of communication interfaces and ports for communicating with various system components, such as input/output (I/O) devices 112, network interface card (NIC) 114, expansion bus(es) 116, computer readable storage medium 130, computer readable NV memory 140, embedded controller (EC) 150, and battery charger and power circuit 170.

Examples of communication interfaces and ports that may be included within southbridge controller/PCH 120 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface. Examples of expansion bus(es) 116 that may be coupled to southbridge controller/PCH 120 include, but are not limited to, a PCI bus, a PCIe bus, a SATA bus, a USB bus, etc.

I/O devices 112 enable a user to interact with IHS 100. In some embodiments, one or more I/O devices 112 may be present within, or coupled to, IHS 100. In some embodiments, I/O device(s) 112 may be separate from the IHS and may interact with the IHS through a wired or wireless connection. Examples of I/O devices 112 include, but are not limited to, keyboards, keypads, touch screens, scanning devices, voice or optical recognition devices, and any other devices suitable for entering or retrieving data.

NIC 114 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof. NIC 114 may communicate data and signals to/from IHS 100 using any known communication protocol.

Computer readable storage medium 130 may be any type of persistent, non-transitory computer readable storage medium, such as one or more hard disk drives (HDDs) or solid-state drives (SSDs), and may be generally configured to store software and/or data. In some embodiments, computer readable storage medium 130 may be configured to store an operating system (OS) 132 for the IHS in addition to one or more user applications 134 and (optionally) user data. OS 132 and user application(s) 134 may generally contain program instructions, which may be executed by host processor 102 to perform various tasks and functions for the information handling system and/or for the user.

Computer readable NV memory 140 may be any type of non-volatile memory including, but not limited to, read-only memory (ROM), flash memory, and non-volatile random access memory (NVRAM), and may be generally configured to store software and/or firmware modules. The software and/or firmware modules stored within computer readable NV memory 140 may generally contain program instructions (or computer program code), which may be executed by host processor 102 to instruct components of IHS 100 to perform various tasks and functions for the information handling system. As shown in FIG. 1, for example, NV memory 140 may store boot firmware (FW) 142 and embedded controller (EC) firmware 144, in addition to other software and/or firmware modules for various information handling system components.

Boot firmware 142 includes software and/or firmware modules for specifying hardware configuration settings, system date/time, boot sequence, etc. In some embodiments, boot firmware 142 may be implemented as a Basic Input/Output System (BIOS) and/or a Unified Extensible Firmware Interface (UEFI). When IHS 100 is powered on or rebooted, program instructions within boot firmware 142 may be executed by host processor 102 and/or EC 150 to configure hardware components of the IHS, perform a Power-On Self-Test (POST) to ensure the hardware configuration is valid and working properly, discover and initialize devices and launch a bootloader to load OS 132. Once launched, the bootloader within boot firmware 142 retrieves OS 132 from computer readable storage medium 130 and loads it into system memory 110.

Embedded controller (EC) 150 may be generally configured to boot the information handling system and perform other functions for the information handling system. For example, EC 150 may be configured to execute program instructions (e.g., a boot block) stored in internal ROM (e.g., ROM 152 of FIG. 2) to initiate a boot process for the information handling system, retrieve EC firmware (EC FW) 144 from NV memory 140, store a local copy of the EC firmware in internal RAM (e.g., RAM 154 of FIG. 2), and execute the EC firmware to perform various steps of the methods disclosed herein. In one embodiment, EC 150 may execute the locally stored copy of EC firmware to detect power rail failure(s) on the system motherboard. In another embodiment, EC 150 may execute the locally stored copy of EC firmware to detect other failures on the system motherboard and/or to confirm that a component or function is operating successfully without the need for human intervention.

Battery charger and power circuit 170 may be included within IHS 100 for moderating the available power from an external or internal power source, supplying operating voltages to information handling system components on a plurality of power rails, and performing other power-related administrative tasks for the information handling system. In some embodiments, the power source can be an external power source, such as AC mains 160 and AC adapter 165, or an internal power source, such as rechargeable battery 180. In addition to other tasks, battery charger and power circuit 170 may be configured to generate and supply operating voltages (e.g., 1.0V, 1.2V, 1.8V 3.3V, 5V, etc.) on a plurality of primary power rails to various IHS components, such as host processor 102, PCH 120, EC 150, and others.

Battery charger IC 190 may be generally configured to monitor the operating voltages generated by battery charger and power circuit 170 and report monitoring results to EC 150. In one example, battery charger IC 190 may monitor the operating voltages supplied to each power rail to detect over-voltage or over-current conditions. In one embodiment, battery charger IC 190 may be used to measure a current associated with each power rail, and to report the power rail currents to EC 150. Although shown as a separate chip in FIG. 1, battery charger IC 190 may alternatively be integrated within battery charger and power circuit 170 or within EC 150, in other embodiments.

Figure 2:
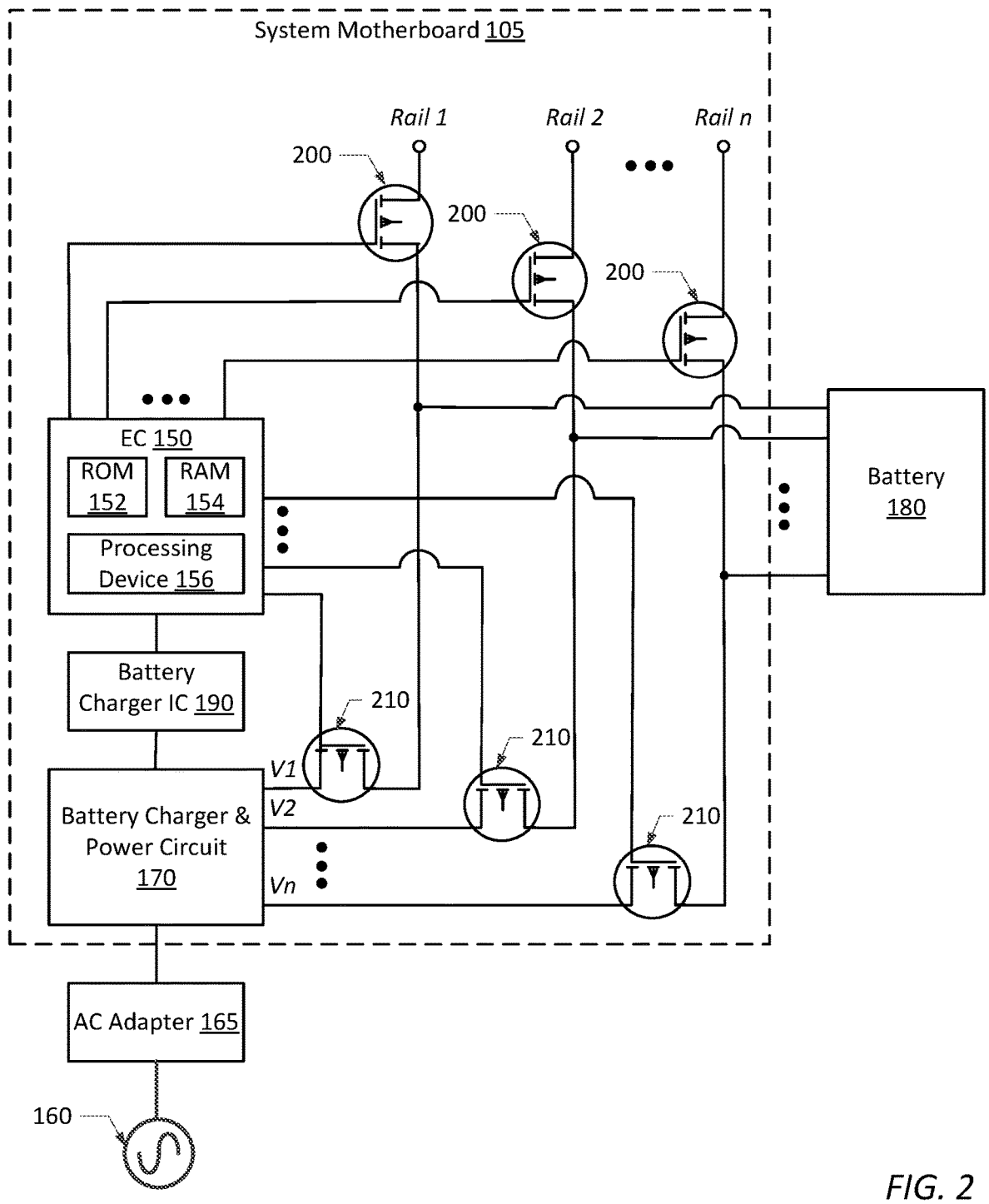
FIG. 2 is a block diagram illustrating various IHS components on a system motherboard that are used to generate, control and supply operating voltages on a plurality of power rails to other IHS components.

FIG. 2 is a block diagram illustrating the IHS components that may be provided on a system motherboard 105 of IHS 100 to generate, control and supply operating voltages on a plurality of power rails to various IHS components. It is noted that, while a small subset of IHS components are illustrated in FIG. 2 as residing on system motherboard 105, the system motherboard is not restricted to including only those components shown in FIG. 2 and described below.

In the embodiment shown in FIG. 2, battery charger and power circuit 170 is provided on system motherboard 105 and configured to moderate the power received from an external or internal power source (e.g., AC mains 160 and AC Adapter 165, or battery 180) to generate operating voltages (V1, V2 . . . Vn), which are supplied on a plurality of primary power rails (Rail 1, Rail 2 . . . Rail n) to various IHS components. Although not shown in FIG. 2, a plurality of voltage regulators may be included within or coupled to battery charger and power circuit 170 for regulating the operating voltages (V1, V2 . . . Vn) supplied to the primary power rails (Rail 1, Rail 2 . . . Rail n).

The power rails of an IHS are generally organized into a topology referred to as a power tree. Each primary power rail (Rail 1, Rail 2 . . . Rail n), which is used directly by one or more IHS components, may have one or more subordinate power rails (not shown in FIG. 2) that branch off of, and therefore, rely upon the primary power rail. Each subordinate power rail is individually controlled by an additional switching element (e.g., a FET) and may be used to supply power to other IHS components. For example, primary power rails may supply power to the Run Rail, Memory, CPU, LCD backlight, and/or LCD timing controller, while subordinate power rails may be used to supply power to a USB camera, USB charger power, Audio, and/or TPM I/O power.

According to one embodiment, the primary power rails (Rail 1, Rail 2 . . . Rail n) shown in FIG. 2 may include, but are not limited to, a +1.0V_PRIM rail, a +1.2V_MEM rail, a +1.8V_PRIM rail, a +3.3V_ALW rail, a +3.3V_RUN rail, a +5V_ALW, and a +5V_RUN rail. In such an embodiment, the +1.0V_PRIM rail may be primary rail to the +1.0V_VCCSTG and +1.0V_VCCST rails. The +1.2V_MEM rail may be a primary rail to the +VCC_S-FR_OC rail. The +1.8V_PRIM rail may be a primary rail to the +1.8V_RUN rail. The +3.3V_RUN rail may be a primary rail to the +3.3V_TSP, +3.3V_CAM, and +3.3V_RUN_AUDIO rails. The +5V_ALW rail may be a primary rail to the +1.0VS_VCCIO, +1.0V_PRIME_CORE, +5V_RUN, +5V_USB_CHG_PWR, and +USB_EX2_PWR rails, and the +5V_RUN rail may be a primary rail to the +5V_RUN_AUDIO rail. In some embodiments, the plurality of primary power rails (Rail 1, Rail 2 . . . Rail n) may also include two LCD panel power rails (LCD backlight and LCD timing controller).

In general, the ALW (ALWAYS) rails feed to the RUN (Computer Active) rails, which feed the device specific power rails. Note, while the +3.3V always and +5.0V always (ALW) power rails are primary to other rails, the always power rails cannot be turned off, and therefore, are not part of the methodologies disclosed herein. Rails connected to an always rail are considered to be primary rails for that reason.

In some embodiments, subordinate power rails (not shown in FIG. 2) coupled to the primary power rails (Rail 1, Rail 2 . . . Rail n) may be used to supply operating voltages to other IHS components. According to one embodiment, subordinate power rails may include, but are not limited to, the +1.0V_VCCSTG and +1.0V_VCCST rails (connected to the +1.0V_PRIM rail); the +VCC_SFR_OC rail (connected to the +1.2V_MEM rail); the +1.8V_RUN rail (connected to the +1.8V_PRIM rail); the +3.3V_TSP, +3.3V_CAM, and +3.3V_RUN_AUDIO rails (connected to the +3.3V_RUN rail); and the +5V_RUN_AUDIO rail (connected to the +5V_RUN rail).

In some embodiments, battery charger IC 190 may be a separate IC provided on system motherboard 105, as shown in FIG. 2. In other embodiments, battery charger IC 190 may be integrated within EC 150 or battery charger and power circuit 170.

Regardless of where it resides, battery charger IC 190 may be configured to monitor the operating voltages (V1, V2 . . . Vn) generated by battery charger and power circuit 170 and report monitoring results to EC 150.

Although not shown in FIG. 2, at least one current sensor (e.g., a current sense resistor) may be coupled to battery charger and power circuit 170 and used to determine the total current consumed by the system. According to one embodiment, battery charger and power circuit 170 may have two input signals that measure voltage coming into the system: one measures voltage before the current sense resistor and the other measures voltage after the current sense resistor. By determining the voltage drop across the current sense resistor, battery charger and power circuit 170 can determine the total current used by the entire system.

As described in more detail below with respect to FIG. 5, the current sensor may be used in various embodiments of the methods disclosed herein to measure a current associated with each of the primary power rails (Rail 1, Rail 2 . . . Rail n), and/or the current associated with each subordinate power rail coupled to a primary power rail. More specifically, the current sensor may be used to measure a current difference that is produced upon turning on each power rail under test separately. In some embodiments, battery charger IC 190 may be coupled directly to the current sensor (or indirectly to the current sensor via battery charger and power circuit 170) and configured to report or supply the current difference associated with each power rail to EC 150 as a current value. By utilizing the current sensor coupled to battery charger and power circuit 170, current values can be obtained for each power rail without the need for including additional dedicated test circuits on each of the power rails.

EC 150 is provided on system motherboard 105 and configured to control the power rails via switching elements (e.g., field effect transistors, FETs) 200 and 210, initiate a boot process for the information handling system and perform various steps of the methods disclosed herein. As shown in FIG. 2, EC 150 may include read only memory (ROM) 152 for storing a boot block, random access memory (RAM) 154 for storing a local copy of the EC firmware 144 stored within NV memory 140, and a processing device 156 for executing program instructions stored locally in ROM 152 and RAM 154. Although not strictly limited to such, processing device 156 may be implemented as a programmable integrated circuit (e.g., a controller, microcontroller, microprocessor, ASIC, etc.) or as a programmable logic device "PLD" (such as FPGA, complex programmable logic device "CPLD", etc.).

When IHS 100 is initially powered on or rebooted, battery charger and power circuit 170 may follow a designated power sequence to supply the operating voltages to various IHS components in a particular order. In one embodiment, a basic power sequence may start with the +3.3V and +5V always (ALW) power rails. The always rails are present whenever AC power is present, are not generally controllable via software and at least one always rail is required for the embedded controller to execute. After the always power rails are powered, power sequencing varies based on the platform. In one embodiment, for example, the chipset and management engine power rails may be enabled, followed by various run rails that are subordinate to the always power rails. Usually, the last power rails to be powered are the device power rails, which are subordinate to the subordinate run rail.

Once a sufficient operating voltage (e.g., +3.3V always voltage) is supplied to EC 150, processing device 156 may initiate a boot process for the information handling system by executing the boot block stored within ROM 152. As used herein, a "boot process" is a process or set of operations performed by one or more information handling system components to load and execute a boot system and prepare the information handling system for OS booting. In some embodiments, processing device 156 may execute program instructions within the boot block stored in ROM 152 to retrieve the EC firmware 144 stored in NV memory 140, store a local copy of the EC firmware 144 in RAM 154 and execute program instructions contained within the EC firmware.

In some embodiments, EC 150 may continue power sequencing the operating voltages supplied to the primary power rails 1 . . . n as directed by sleep state exit signals (e.g., SLP_S5 #, SLP_S4 #, SLP_S3 #, etc.) supplied by PCH 120 and power good signals, which are supplied to the PCH to indicate that a voltage regulator coupled to the power rail is providing a sufficient operating voltage. As described in more detail below, processing device 156 may execute program instructions within the EC firmware stored locally in RAM 154 to monitor and detect failures on the primary power rails when the IHS is initially powered on or rebooted. In some embodiments, the EC firmware stored locally in RAM 154 may be executed by processing device 156 to detect failures on one or more subordinate power rails coupled to a primary power rail and/or to test other components and/or functionality of the system motherboard.

When a sufficient operating voltage (e.g., +3.3V always voltage) is supplied to PCH 120 and the PCH comes out of reset, host processor 102 retrieves the boot firmware 142 stored in NV memory 140, stores a local copy of the boot firmware 142 into system memory 110 and executes program instructions within the boot firmware to configure hardware components of the IHS, perform a Power-On Self-Test (POST), discover and initialize devices and launch a bootloader to load OS 132. In some cases, the information handling system may fail to complete the POST (resulting in a no POST failure) or may fail to power on completely (resulting in a no power failure). In some cases, a no power or no POST failure may be due to a short circuit on one or more of the primary power rails 1 . . . n on the system motherboard, or may be caused by a damaged voltage regulator or switching element (FET) 200/210.

In some cases, a short circuit on a subordinate power rail may result in other types of failures. For example, a short on the hard drive power rail can cause the system to hang or turn off only after the first access to the hard drive. A short on the audio power rail may cause the system to turn off when audio is first accessed, which may be long after booting. Sometimes instead of causing the system to turn off, a short on a subordinate power rail may cause the device(s) on that rail to lose power and fail to work. Prior to the systems and methods disclosed herein, failures such as these were difficult to detect and often required a motherboard replacement.

In the past, information handling systems were typically sent to a service center for diagnostics and/or repair when motherboard failures (including no power/no POST failures and other failures) occurred, resulting in end user down time and service costs. Some of these systems included dedicated test circuits on the power rails to test the power rails and determine if the power rail voltages were within expected ranges. In systems without dedicated test circuits, however, it is difficult to determine if a no power/no POST failure was caused by a power rail failure, or due to some other means, and therefore difficult to determine if the system motherboard should be replaced (in the case of a power rail failure) or could be repaired (e.g., by removing or simulating removal of the system clock battery). In some cases, difficulty in determining the root cause of a no power/no POST failure often resulted in repeat service dispatches and increased service costs.

To overcome these disadvantages, the present disclosure provides an improved system and methods to detect failures on one or more power rails provided on the system motherboard without including dedicated test circuits on the power rails. In addition to testing power rails, the present disclosure provides an improved system and method to test other motherboard components and functionality (e.g., LEDs, keyboard backlight, LCD backlight, PC speaker, LCD built-in self-test, etc.) without dedicated test circuits or human intervention. By providing the information handling system with the means to test power rails and other components and functionality of the system motherboard, the present disclosure provides a more reliable method to determine if the system motherboard should be replaced (or repaired), prevents repeat service dispatches and reduces costs associated with service repairs.

Figure 3:
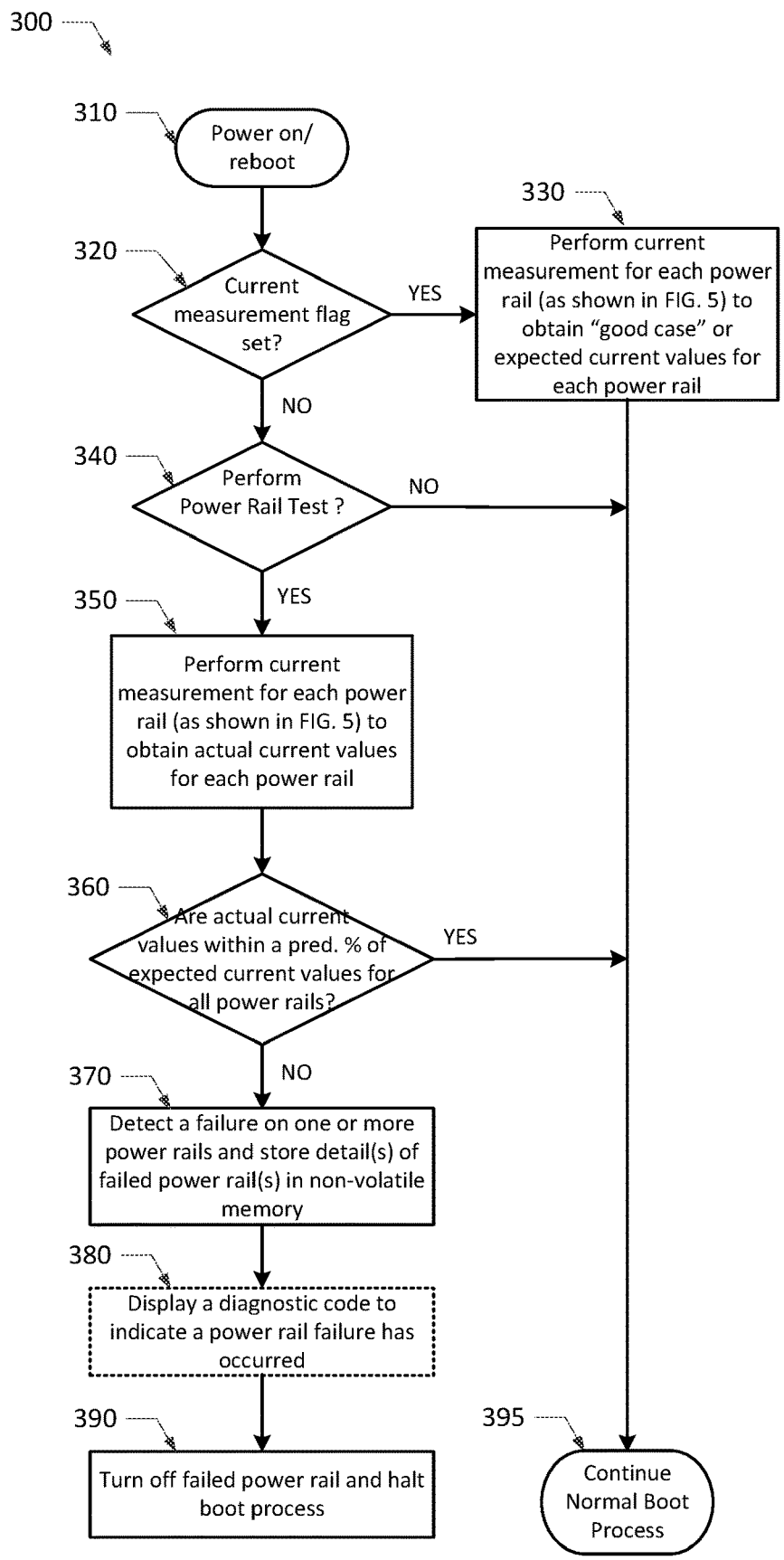
FIG. 3 is a flowchart diagram illustrating one embodiment of a method that may be used to detect a failure on one or more primary power rails provided on the system motherboard.

FIG. 3 illustrates one embodiment of a method 300 that may be performed to detect a failure on one or more power rails provided on the system motherboard of an information handling system (IHS). Generally speaking, method 300 may be used to detect a failure on one or more of the primary power rails (Rail 1, Rail 2 . . . Rail n), or on a subordinate power rail (not shown) coupled to a primary power rail, if the primary rail is powered when the subordinate rail is tested.

According to one embodiment, method 300 may be performed by an embedded controller (e.g., EC 150) of an information handling system (e.g., IHS 100) when the IHS is initially powered on or rebooted. Although described in the context of an embedded controller executing locally stored program instructions (e.g., EC firmware stored within RAM 154), method 300 may be alternatively performed by another IHS processing device executing other program instructions. As such, the method shown in FIG. 3 represents a computer implemented method, which is performed by hardware, software and/or firmware components of an information handling system.

The computer implemented method shown in FIG. 3 and disclosed herein improves how the information handling system functions, in at least some respects, by enabling the IHS to detect a failure on one or more power rails (if such failure occurs) when the IHS is booted and store indication of the failed power rail(s) to aid in diagnostics and repair. Unlike conventional solutions, the method shown in FIG. 3 is able to detect power rail failures without including dedicated test circuits on the power rails. Instead, a BIOS update may be performed to integrate the proposed solution illustrated in FIG. 3 into new information handling systems and those already deployed in the field, thereby reducing or eliminating the cost associated with the proposed solution.

Figure 4:
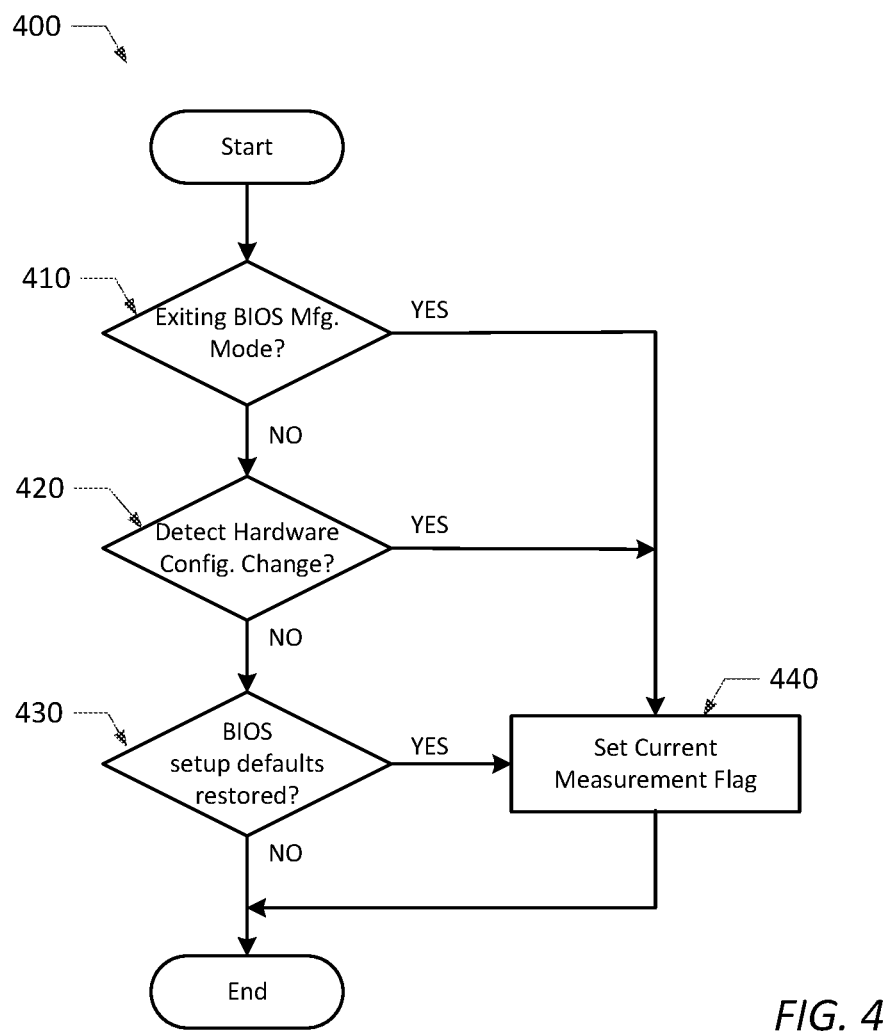
FIG. 4 is a flowchart diagram illustrating one embodiment of a method that may be used to trigger an expected current measurement, or update existing expected current values stored in memory, for each of the primary power rails.

According to one embodiment, method 300 may begin when an information handling system (such as IHS 100) is initially powered on or rebooted (in step 310) to begin a boot process for the IHS. In step 320, the embedded controller determines if a current measurement flag is set. As shown in FIG. 4 and described in more detail below, a current measurement flag may be set, for example, upon exiting a BIOS manufacturing mode, detecting a hardware configuration change, restoring BIOS setup default settings or performing a firmware update for an IHS component.

If the current measurement flag is set (YES branch of step 320), the embedded controller may perform a current measurement, or update an existing current measurement, for each power rail of a plurality of power rails to obtain "good case" or expected current values for each power rail (in step 330). FIG. 5 illustrates one embodiment of a method 500 that may be used to perform a current measurement, or update an existing current measurement, for each power rail. As described in more detail below, the "good case" or expected current values (including expected current value and power rail number) for each power rail may be stored in non-volatile memory (e.g., RAM 154 or another non-volatile memory included within, or accessible to, EC 150) for subsequent comparison purposes. Once the "good case" or expected current values are obtained for each power rail (in step 330), the normal boot process is continued (in step 395).

If the current measurement flag is not set (NO branch of step 320), the embedded controller determines whether or not a power rail test should be performed (in step 340). In some embodiments, the embedded controller may determine that a power rail test should be performed (in step 340) if a boot failure occurs (i.e., the system fails to boot). In other embodiments, the embedded controller may determine that a power rail test should be performed (in step 340) if a hotkey (e.g., power rail test hotkey) is depressed. In some embodiments, the hotkey may be held down while another button (e.g., the power button) is pressed to initiate a power rail test. If the embedded controller determines that a power rail test is not needed (NO branch of step 340), the normal boot process is continued (in step 395).

If the embedded controller determines that a power rail test is needed (YES branch of step 340), the embedded controller performs a current measurement for each of the plurality of power rails separately to obtain actual current values for each power rail (in step 350). FIG. 5 illustrates one embodiment of a method 500 that may be used to perform a current measurement for each power rail to obtain actual current values. In step 360, the actual current values obtained in step 350 are compared with the "good case" or expected current values, which were previously determined in step 330 and stored in non-volatile memory. The embedded controller may continue the normal boot process (in step 395) if the actual current values for all power rails are within a predetermined percentage (e.g., +/−20%) or a predetermined amount (e.g., +/−500 mA) of the "good case" or expected current values (YES branch of step 360).

The embedded controller may detect a failure on one or more of the primary power rails and store detail(s) of the failed power rail(s) in non-volatile memory (in step 370), if the actual current value(s) and the expected current value(s) for the one or more power rails differ (+ or −) by more than the predetermined percentage/amount (NO branch of step 360). For example, the embedded controller may detect a short circuit on a power rail if the actual current value obtained for that power rail in step 350 is greater than the expected current value stored for that power rail in step 330 by more than approximately 20%. On the other hand, the embedded controller may detect a damaged voltage regulator or switching element 200/210 associated with a power rail, if the actual current value obtained for that power rail in step 350 is less than the expected current value stored for that power rail in step 330 by more than approximately 20%.

In one embodiment, the embedded controller may store the power rail number of the failed power rail(s) in non-volatile memory (in step 370). In some embodiments, the embedded controller may also store the expected current value, the actual current value and/or a timestamp (identifying when the actual current was measured) for each of the failed power rail(s) (in step 370). In some embodiments, a diagnostic code (e.g., an LED blink code) may be displayed (in optional step 380) to indicate that a power rail failure has occurred. The stored detail(s) of the power rail failure(s) and/or the displayed diagnostic code may be used to determine if the system motherboard should be replaced or simply repaired. Once details of the power rail failures are stored (in step 370), the boot process is halted with the failed power rails turned off (in step 390).

FIG. 4 is a flowchart diagram illustrating one embodiment of a method 400 that may be used to trigger a "good case" or expected current measurement, or update existing expected current values stored in memory, for each of a primary plurality of power rails. According to one embodiment, method 400 may be performed by an embedded controller (e.g., EC 150) executing locally stored program instructions (e.g., EC firmware stored within RAM 154) to determine if "good case" or expected current values for each power rail should be obtained or updated. As shown in the embodiment of FIG. 4, an embedded controller may set a current measurement flag (in step 440) upon exiting a BIOS manufacturing mode (in step 410), detecting a hardware configuration change (in step 420) or restoring BIOS setup default settings (in step 430). In some embodiments, a current measurement flag may also be set (in step 440) any time a persistent change is made to the IHS, such as when firmware updates are performed for hardware components (e.g., a HDD).

Like method 300, method 400 represents a computer implemented method, which is performed by hardware, software and/or firmware components of an information handling system. Although described in the context of an embedded controller executing program instructions, method 400 may be alternatively performed by another IHS processing device executing other program instructions. The computer implemented method shown in FIG. 4 and disclosed herein improves how the information handling system functions, in at least one respect, by ensuring that an accurate expected current value is maintained for each power rail even when changes are made to system hardware, firmware or software configuration settings. Like the method shown in FIG. 3, the method shown in FIG. 4 may be integrated into new and in-the-field information handling systems via a BIOS update, in one embodiment.

Figure 5:
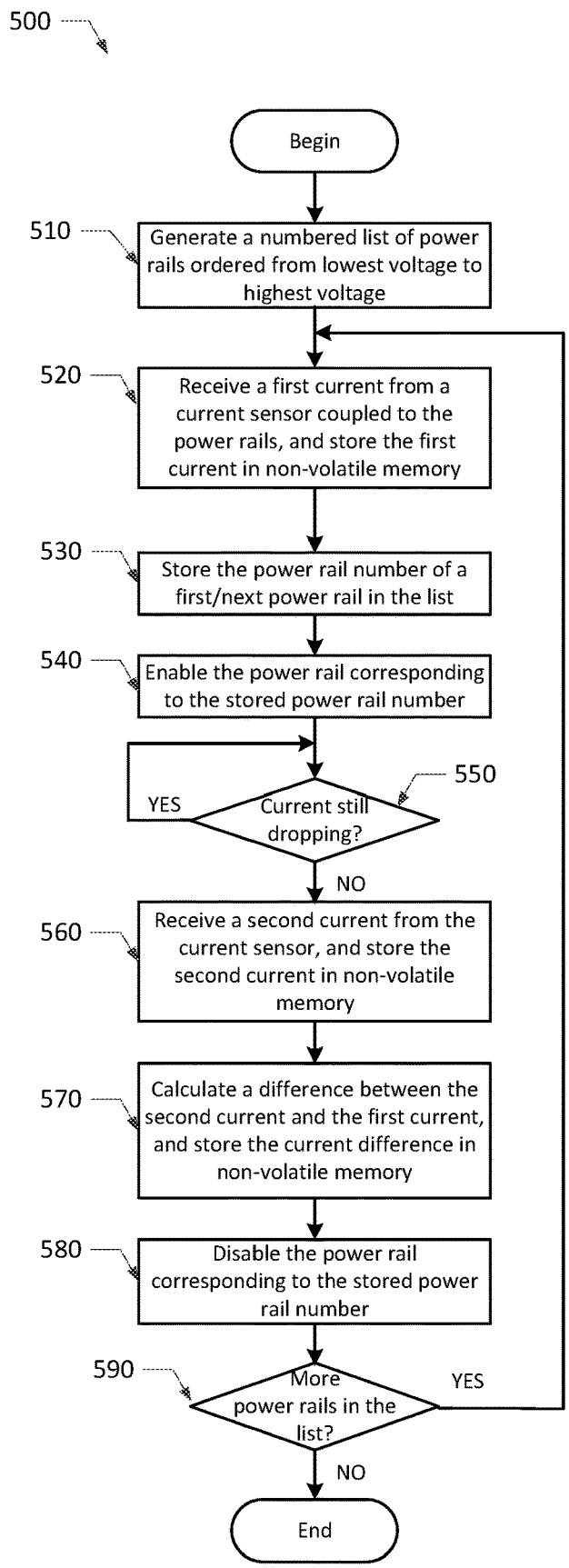
FIG. 5 is a flowchart diagram illustrating one embodiment of a method that may be used to obtain a current measurement for each of the primary power rails.

FIG. 5 is a flowchart diagram illustrating one embodiment of a method 500 that may be used to obtain current measurements for each of a plurality of power rails. As in method 300 of FIG. 3, method 500 may be used to obtain current measurements for each of the primary power rails (Rail 1, Rail 2 . . . Rail n), or for each subordinate power rail (not shown) coupled to a primary power rail, if the primary rail is powered when current on the subordinate rail is measured.

According to one embodiment, method 500 may be performed by an embedded controller (e.g., EC 150) of an information handling system (e.g., IHS 100). Although described in the context of an embedded controller executing locally stored program instructions (e.g., EC firmware stored within RAM 154), method 500 may be alternatively performed by another IHS processing device executing other program instructions. As such, the method shown in FIG. 5 represents a computer implemented method, which is performed by hardware, software and/or firmware components of an information handling system.

The computer implemented method shown in FIG. 5 and disclosed herein improves how the information handling system functions, in at least one respect, by enabling the current on each of a plurality of power rails to be measured without including dedicated test circuits on the power rails. Instead, method 500 may use the current sensor coupled to battery charger and power circuit 170 to measure the current associated with each power rail. Like the method shown in FIGS. 3-4, the method shown in FIG. 5 may be integrated into new and in-the-field information handling systems via a BIOS update, in one embodiment.

In some embodiments, method 500 may begin with only the power rail (e.g., the +3.3V always rail) supplied to the embedded controller enabled when obtaining current measurements for the primary power rails (Rail 1, Rail 2 . . . Rail n). If the method steps shown in FIG. 5 are used to obtain current measurement(s) for subordinate power rail(s), however, the primary power rail coupled to the subordinate power rails(s) may also be powered when the method begins.

In step 510, the embedded controller generates a numbered list of power rails ordered, in one example embodiment, from lowest voltage to highest voltage. The embedded controller performs steps 520-590 for each power rail in the list beginning, for example, with the power rail having the lowest voltage. In step 520, the embedded controller receives or measures a first current from a current sensor coupled to the power rails, and stores the first current in non-volatile memory (e.g., RAM 154 or another non-volatile memory within or accessible to EC 150). In one embodiment, the current sensor within battery charger IC 190 and/or coupled to battery charger and power circuit 170 may be used to measure the first current, which is reported by battery charger IC 190 to the embedded controller as a current value. In step 530, the embedded controller stores the power rail number (e.g., 1) of the first power rail in the list in non-volatile memory. If the power rail fails and causes the IHS to shut down or reboot, the stored power rail number (e.g., 1) may be used later to identify the failed power rail. In step 540, the embedded controller enables the power rail corresponding to the stored power rail number. In one example embodiment, EC 150 may enable or turn the power rail on via corresponding switching elements 200/210, as shown in FIG. 2.

In step 550, the embedded controller waits for the current on the power rail to stop dropping. When the current on the power rail is stabilized (NO branch of step 550), the embedded controller receives or measures a second current from the current sensor, and stores the second current in non-volatile memory (in step 560). In step 570, the embedded controller calculates a difference between the second current and the first current and stores the current difference in non-volatile memory. Once the current difference is stored, the embedded controller disables the power rail corresponding to the stored power rail number (in step 580) and determines if there are any more power rails in the list (in step 590). If there are remaining power rails in the list (YES branch of step 590), the embedded controller repeats steps 520-590 for the next power rail in the list, until none remain (NO branch of step 590).

As set forth above, the methods shown in FIGS. 3-5 may be used to detect a failure on one or more primary power rails (Rail 1, Rail 2 . . . Rail n) or subordinate power rails (not shown provided on a system motherboard of an information handling system. The methods disclosed above do so by storing "good case" or expected current values for each power rail, updating the expected current values for each power rail whenever a persistent change is made to the information handling system, and comparing actual current values to expected current values for each power rail to detect failures on the power rails.

In addition to detecting failures on primary power rails, the present disclosure provides improved systems and methods to detect and identify failures on subordinate power rails. When a short circuit occurs on a subordinate power rail, turning on that power rail will cause the current measured by the current sensor to rise, but will eventually cause the voltage regulator for the primary power rail corresponding to the subordinate power rail to turn off (as a precaution).

Figure 6:
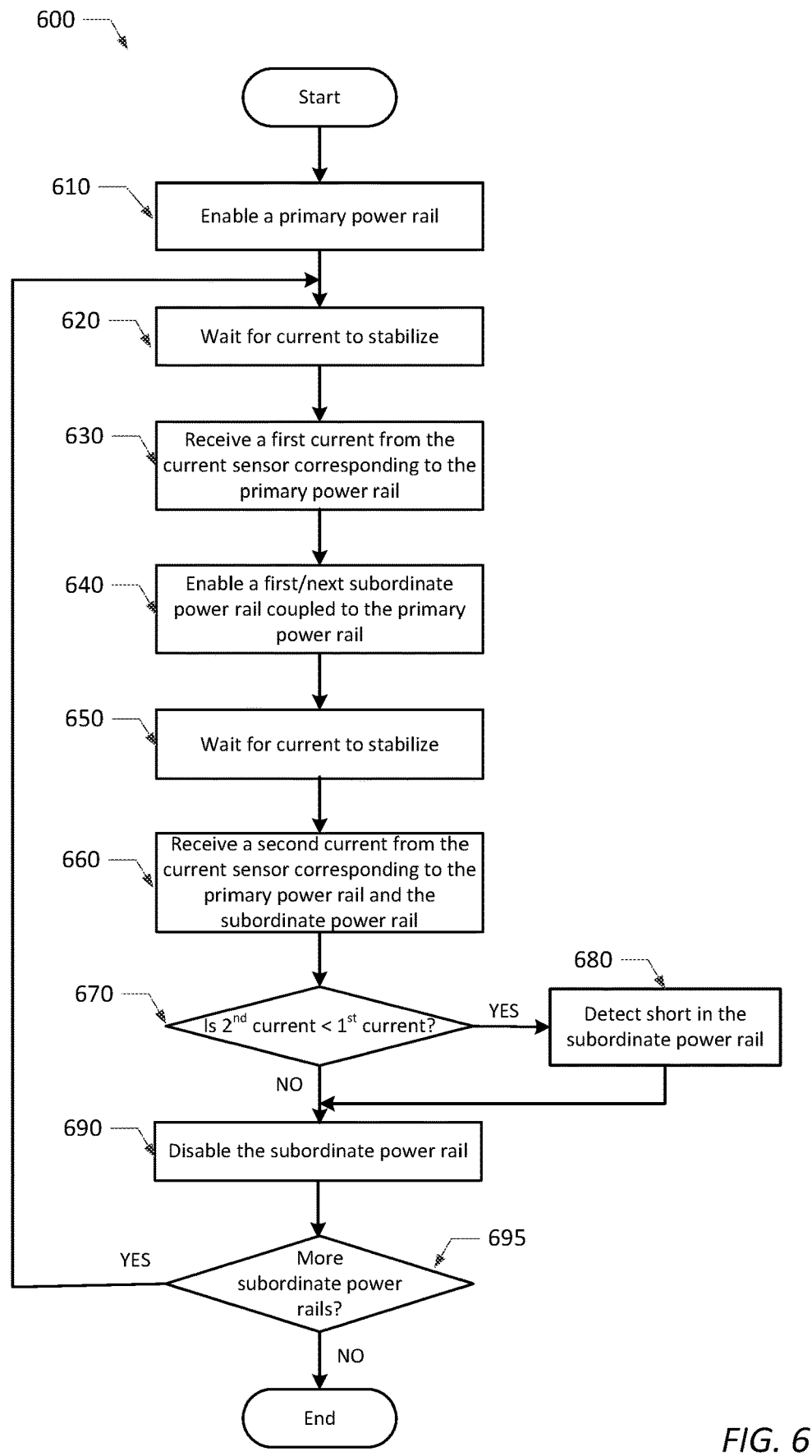
FIG. 6 is a flowchart diagram illustrating one embodiment of a method that may be used to detect a failure on one or more subordinate power rails coupled to a primary power rail.

FIG. 6 is a flowchart diagram illustrating another embodiment of a method 600 that may be used to detect a failure (e.g., a short circuit) on one or more subordinate power rails coupled to a primary power rail. According to one embodiment, method 600 may be performed by an embedded controller (e.g., EC 150) of an information handling system (e.g., IHS 100). Although described in the context of an embedded controller executing locally stored program instructions (e.g., EC firmware stored within RAM 154), method 600 may be alternatively performed by another IHS processing device executing other program instructions. As such, the method shown in FIG. 6 represents a computer implemented method, which is performed by hardware, software and/or firmware components of an information handling system.

The computer implemented method shown in FIG. 6 and disclosed herein improves how the information handling system functions, in at least one respect, by enabling the IHS to detect a failure on a subordinate power rail coupled to a primary power rail (if such a failure occurs) without including dedicated test circuits on the power rails. Like the methods shown in FIGS. 3-5 and discussed above, the method shown in FIG. 6 may be integrated into new and in-the-field information handling systems via a BIOS update, in one embodiment. Unlike the methods shown in FIGS. 3 and 5, the method shown in FIG. 6 does not require expected and/or actual current values to be stored for the subordinate power rails.

According to one embodiment, method 600 may begin (in step 610) when a primary power rail is enabled by the embedded controller. After waiting for the current on the primary power rail to stabilize (in step 620), the embedded controller receives or measures a first current from a current sensor coupled to the primary power rail (in step 630). In one embodiment, the current sensor within battery charger IC 190 and/or coupled to battery charger and power circuit 170 may be used to measure the first current, which is reported by battery charger IC 190 to the embedded controller. Next, the embedded controller enables a first subordinate power rail coupled to the primary power rail (in step 640), waits for the current to stabilize (in step 650) and receives or measures a second current from the current sensor (in step 660) corresponding to the current on the primary power rail and the subordinate power rail. If the second current is less than the first current (YES branch of step 670), the embedded control detects a failure (e.g., a short circuit) on the subordinate power rail (in step 680). After disabling the subordinate power rail (in step 690), the embedded controller determines if there are any more subordinate power rails coupled to the primary power rail (in step 695). If so, the embedded controller repeats steps 620-695 for the next subordinate power rail, until none remain (NO branch of step 695).

In addition to primary and subordinate power rails, there are several components on the system motherboard that currently require human intervention to test. For example, current test methods require an end user to confirm whether or not light emitting diodes (e.g., LEDs on the system motherboard or on a connected I/O board), the keyboard backlight, and the speaker beep is working properly. In addition, current test methods also require an end user to confirm whether or not the brightness level of the display screen (e.g., LCD) backlight panel can be modified, and/or if a display screen built-in self-test (BIST) is displayed or viewable on the display screen. To overcome these disadvantages, the present disclosure provides improved systems and methods for testing other components and/or functions on a system motherboard of an information handling system without the need for human intervention.

Figure 7:
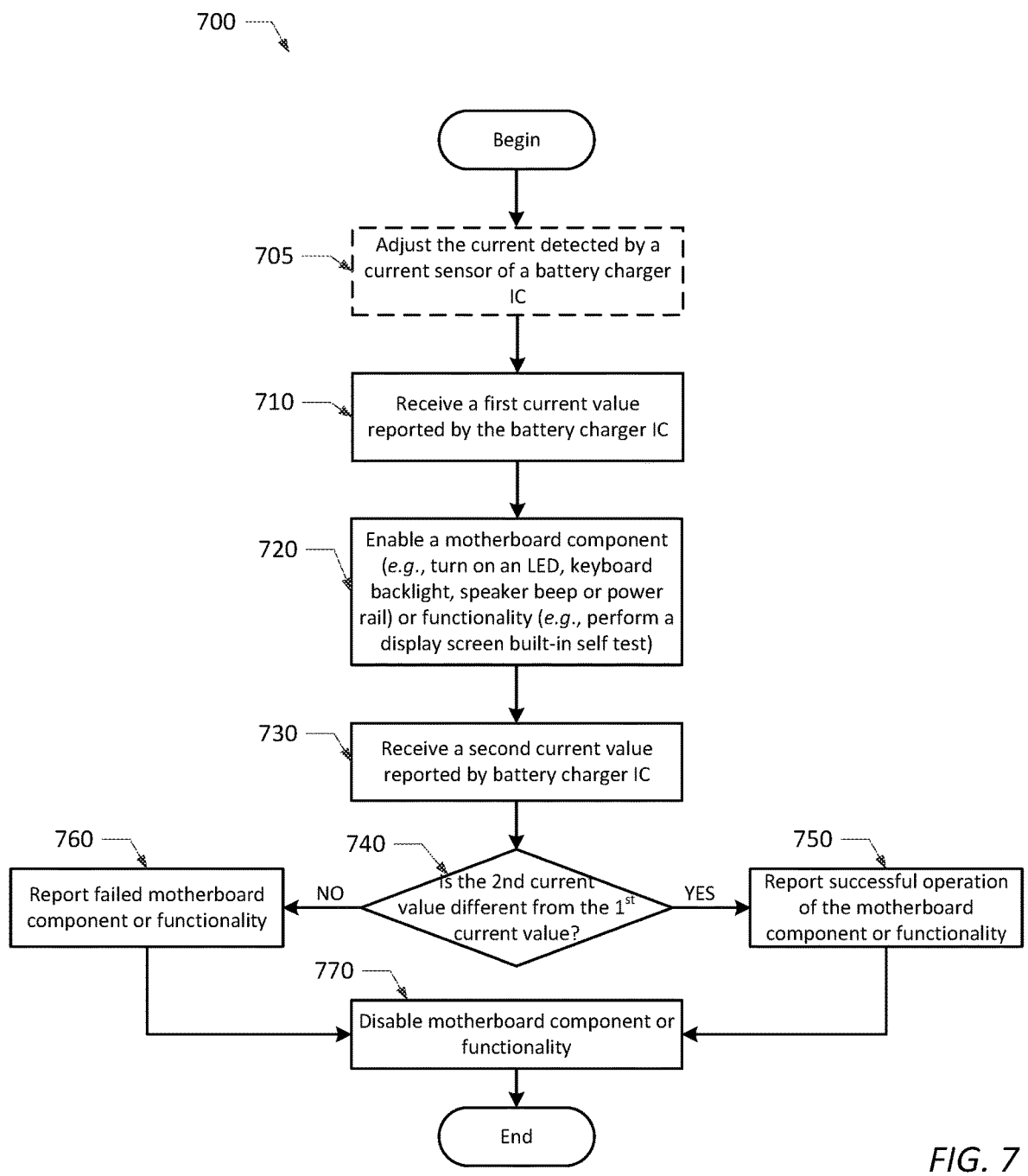
FIG. 7 is a flowchart diagram illustrating one embodiment of a method that may be used to test system motherboard components and/or functionality without human intervention.

FIG. 7 is a flowchart diagram illustrating one embodiment of a method 700 that may be used to test system motherboard components and/or functionality without human intervention. According to one embodiment, method 700 may be performed by an embedded controller (e.g., EC 150) of an information handling system (e.g., IHS 100). Although described in the context of an embedded controller executing locally stored program instructions (e.g., EC firmware stored within RAM 154), method 700 may be alternatively performed by another IHS processing device executing other program instructions. As such, the method shown in FIG. 7 represents a computer implemented method, which is performed by hardware, software and/or firmware components of an information handling system.

The computer implemented method shown in FIG. 7 and disclosed herein improves how the information handling system functions, in at least one respect, by enabling the IHS to detect failures or confirm successful functioning of system motherboard components or functionality without the need for human intervention. Like the methods shown in FIGS. 3-6, the method shown in FIG. 7 may be integrated into new and in-the-field information handling systems via a BIOS update, in one embodiment.

Figure 8:
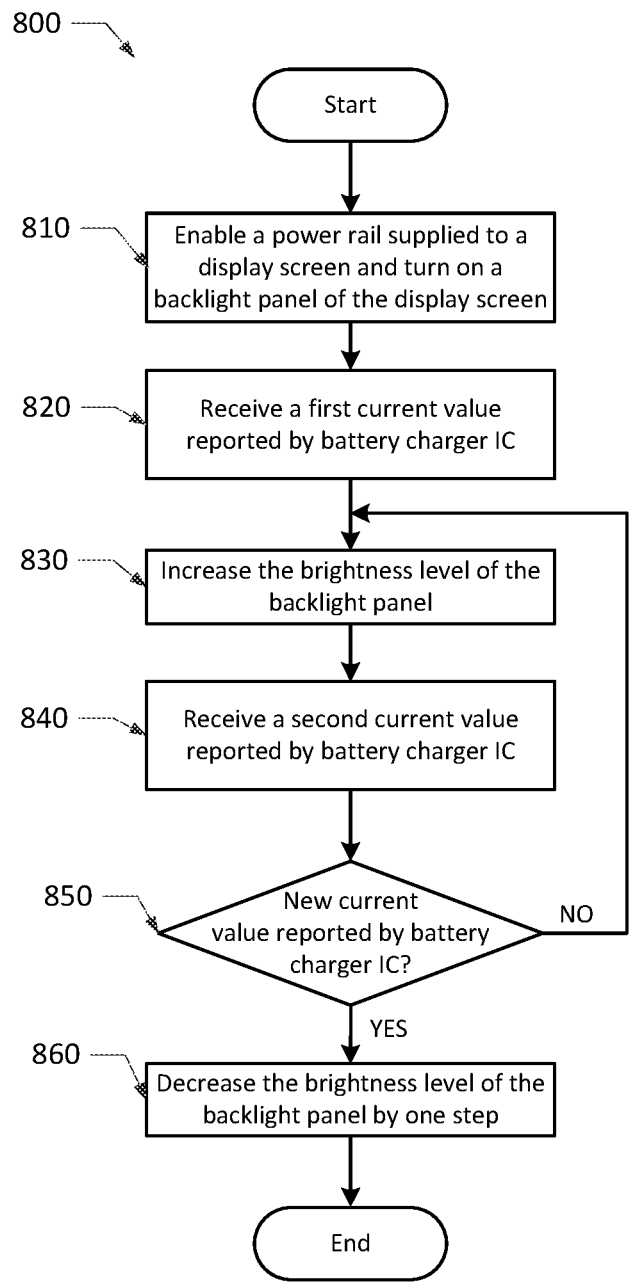
FIG. 8 is a flowchart diagram illustrating one embodiment of a method that may be used to enable a battery charger integrated circuit (IC) with relatively low sensitivity to measure a relatively small current change.

According to one embodiment, method 700 may begin when only the power rail (e.g., the +3.3V always rail) supplied to the embedded controller is enabled. In some embodiments, the embedded controller may adjust the current detected by a current sensor of a battery charger IC (e.g., battery charger IC 190 of FIGS. 1 and 2) in optional step 705 to enable a battery charger IC with relatively low measurement sensitivity to detect a current change and report a new current value even when the current change is below the measurement sensitivity of the battery charger IC. FIG. 8 illustrates one embodiment of a method 800 that may be used to adjust the current detected by the current sensor in optional step 705 of method 700.

In step 710, the embedded controller receives a first current value from the battery charger IC. In step 720, the embedded controller enables a motherboard component (e.g., turns on one or more LEDs, activates a keyboard backlight or speaker beep, or enables a power rail) or performs a motherboard function (e.g., performs display built-in self-test, BIST). Next, the embedded controller receives a second current value from the battery charger IC (in step 730) and determines (in step 740) if the second current value received in step 730 is "new" or different from the first current value received in step 710. If the second current value is different from the first current value (YES branch of step 740), the embedded controller reports successful operation of the motherboard component or functionality (in step 750) and disables the motherboard component or functionality (in step 770). If the second current value is the same as the first current value (NO branch of step 740), the embedded controller reports a failed motherboard component or functionality (in step 760) before disabling the motherboard component or functionality (in step 770).

In some embodiments, battery charger IC 190 may not have enough measurement sensitivity to report a change in current values at steps 710 and 730 even when the motherboard component or functionality is working properly. For example, the current associated with turning on a single LED or illuminating the keyboard backlight is typically very small (e.g., less than about 100 mA) and may be less than the measurement sensitivity of the battery charger IC (e.g., 130 mA).

To overcome this problem, a method 800 is provided in FIG. 8 to enable a battery charger IC with relatively low measurement sensitivity to detect a current change and report a new current value even when the current change is below the measurement sensitivity of the battery charger IC. In some embodiments, method 800 may be performed during step 705 of method 700 to enable a battery charger IC with relatively low measurement sensitivity to detect a small current change when a motherboard component (e.g., an LED, keyboard backlight or speaker beep) is turned on or a motherboard function (e.g., an LCD BIST) is performed, and to report a new current value in steps 730 and 740 when the motherboard component or function is working properly. In other embodiments, method 800 may be performed during step 705 of method 700 to enable a battery charger IC with relatively low measurement sensitivity to detect a current difference associated with turning on individual power rails on the system motherboard.

According to one embodiment, method 800 may be performed by an embedded controller (e.g., EC 150) of an information handling system (e.g., IHS 100). Although described in the context of an embedded controller executing locally stored program instructions (e.g., EC firmware stored within RAM 154), method 700 may be alternatively performed by another IHS processing device executing other program instructions. As such, the method shown in FIG. 8 represents a computer implemented method, which is performed by hardware, software and/or firmware components of an information handling system. The computer implemented method shown in FIG. 8 and disclosed herein improves how the information handling system functions, in at least one respect, by enabling a battery charger IC with relatively low sensitivity to detect a small current change and report a new current value even when the current change is below the measurement sensitivity of the battery charger IC.

According to one embodiment, method 800 may begin when the embedded controller enables a power rail supplied to a display screen (e.g., display device 108) of the information handling system and turns on a backlight panel for the display screen (in step 810). Next, the embedded controller receives a first current value from the battery charger IC (in step 820), increases the brightness level of the backlight panel (in step 830) and receives a second current value from the battery charger IC (in step 840). The embedded controller determines (in step 850) if the second current value received in step 840 is "new" or different from the first current value received in step 820. If a "new" current value is not reported by the battery charger IC (NO branch of step 850), the embedded controller repeats steps 830-850 until a "new" current value is reported by the battery charger IC. Once a "new" current value is reported by the battery charger IC (YES branch of step 850), the embedded controller decreases the brightness level of the backlight panel by one step (in step 860) and the method ends.

The method shown in FIG. 8 adjusts the current detected by the current sensor within the battery charger IC until the detected current almost reaches, but does not surpass, the next current value that can be reported by the battery charger IC. By preloading the current sensor with current from a power rail not under test (e.g., a power rail supplied to the display screen), the method shown in FIG. 8 enables a battery charger IC with relatively low sensitivity to detect small amounts of current change that may occur when a power rail under test or another motherboard component is enabled, or when other motherboard functionality is performed.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
   a battery charger and power circuit configured to generate operating voltages, which are supplied on a plurality of power rails to IHS components;
   a non-volatile memory configured to store expected current values for each of the plurality of power rails;
   an embedded controller (EC) configured to execute program instructions to determine if a current measurement flag is set each time the IHS is powered on or rebooted;
   wherein if the current measurement flag is set, the embedded controller is further configured to execute the program instructions to perform a current measurement for each of the power rails separately to obtain or update the expected current values stored for each power rail within the non-volatile memory;
   wherein if the current measurement flag is not set, the embedded controller is further configured to execute the program instructions to determine if a boot failure has occurred or a power rail test hotkey included within the IHS has been depressed since the IHS was powered on or rebooted;

wherein if the embedded controller determines that a boot failure has occurred or a power rail test hotkey has been depressed, the embedded controller is further configured to execute the program instructions to perform a power rail test by:

performing a current measurement for each of the power rails separately to obtain actual current values for each power rail;

comparing the actual current values obtained for each power rail to the expected current values stored for each power rail within the non-volatile memory; and detecting a failure on at least one of the power rails if the actual current value obtained for the at least one power rail differs from the expected current value stored for the at least one power rail by more than a predetermined percentage or amount.

2. The information handling system as recited in claim 1, further comprising a battery charger integrated circuit (IC), which is coupled to the battery charger and power circuit to measure current associated with one or more of the power rails and report the current measurement to the embedded controller as a current value.

3. The information handling system as recited in claim 1, wherein if the embedded controller determines that a boot failure has not occurred or a power rail test hotkey has not been depressed, the embedded controller is further configured to execute the program instructions to continue a boot process for the IHS without performing the power rail test.

4. The information handling system as recited in claim 1, wherein if a failure is detected on the at least one power rail, the embedded controller is further configured to execute the program instructions to store one or more details of the at least one power rail in a non-volatile memory of the IHS.

5. The information handling system as recited in claim 4, wherein the one or more details include a power rail number of the at least one power rail.

6. The information handling system as recited in claim 5, wherein the one or more details further include one or more of: the expected current value for the at least one power rail, the actual current value for the at least one power rail, and a timestamp identifying when the actual current value was obtained for the at least one power rail.

7. The information handling system as recited in claim 1, wherein the current measurement flag is set upon exiting a BIOS manufacturing mode, detecting a hardware configuration change, restoring BIOS setup default settings, or performing a firmware update for an IHS component.

8. The information handling system as recited in claim 1, wherein in order to perform a current measurement to obtain actual current values for each power rail, or to update the expected current values stored for each power rail, the embedded controller is further configured to execute the program instructions to:

generate a numbered list of the power rails;

receive a first current from a current sensor coupled to the power rails, wherein the first current is received when only a power rail suppled to the embedded controller is enabled;

store a power rail number of a power rail in the numbered list;

enable the power rail corresponding to the stored power rail number;

receive a second current from the current sensor when only the power rail suppled to the embedded controller and the power rail corresponding to the stored power rail number are enabled;

store a difference between the second current and the first current in a non-volatile memory of the IHS, wherein the difference corresponds to the actual current value or the expected current value for the power rail;

disable the power rail; and repeat the steps of receiving a first current, storing a power rail number, enabling the power rail, receiving a second current, storing a difference and disabling the power rail for each power rail remaining in the numbered list.

9. A method to detect a failure on one or more of a plurality of power rails provided on a system motherboard of an information handling system (IHS), the method comprising:

determining if a current measurement flag is set each time the IHS is powered on or rebooted;

wherein if the current measurement flag is set, the method further comprises:

performing a separate current measurement for each of the power rails to obtain or update expected current values for each power rail; and storing the expected current values for each power rail in a non-volatile memory of the IHS;

wherein if the current measurement flag is not set, the method further comprises determining if a power rail test should be performed;

wherein if the method determines that the power rail test should be performed, the method further comprises:

performing a current measurement for each of the power rails separately to obtain actual current values for each power rail;

comparing the actual current values obtained for each power rail to the expected current values stored for each power rail; and detecting a failure on at least one of the power rails if the actual current value obtained for the at least one power rail differs from the expected current value stored for the at least one power rail by more than a predetermined percentage or amount; and wherein if the method determines that the power rail test should not be performed, the method further comprises continuing a boot process for the IHS without performing the power rail test.

10. The method as recited in claim 9, wherein if a boot failure occurs or a power rail test hotkey included within the IHS is depressed, the method determines that the power rail test should be performed.

11. The method as recited in claim 9, wherein if a failure is detected on the at least one power rail, the method further comprises storing one or more details of the at least one power rail.

12. The method as recited in claim 9, further comprising setting the current measurement flag upon one or more of the following: exiting a BIOS manufacturing mode, detecting a hardware configuration change, restoring BIOS setup default settings, and performing a firmware update for an IHS component.

13. The method as recited in claim 9, wherein said performing a current measurement to obtain actual current values for each power rail, or to update the expected current values stored for each power rail, comprises:

generating a numbered list of the power rails;
receiving a first current from a current sensor coupled to the power rails, wherein the first current is received when only a power rail suppled to an embedded controller of the IHS is enabled;
storing a power rail number of a power rail in the numbered list;
enabling the power rail corresponding to the stored power rail number;
receiving a second current from the current sensor when only the power rail suppled to the embedded controller and the power rail corresponding to the stored power rail number are enabled;
storing a difference between the second current and the first current in non-volatile memory, wherein the difference corresponds to the actual current value or the expected current value for the power rail;
disabling the power rail; and
repeating the steps of receiving a first current, storing a power rail number, enabling the power rail, receiving a second current, storing a difference and disabling the power rail for each power rail remaining in the numbered list.

14. A method to test a system motherboard component or function, the method comprising:
adjusting a current detected by a current sensor, which is coupled to one or more power rails provided on a system motherboard of an information handling system (IHS), until the detected current almost reaches, but does not surpass, the next current value that can be reported by a battery charger integrated circuit (IC) coupled to the current sensor;
receiving a first current value from the battery charger IC;
enabling the system motherboard component or function;
receiving a second current value from the battery charger IC; and
reporting a failure for the system motherboard component or function if the second current value does not differ from the first current value.

15. The method as recited in claim 14, further comprising reporting successful operation of the system motherboard component or function if the second current value differs from the first current value.

16. The method as recited in claim 14, wherein said adjusting a current comprises:
enabling a power rail supplied to a display screen of the IHS and turning on a backlight panel for the display screen;
receiving a current value from the battery charger IC;
adjusting the current supplied to the power rail to increase a brightness level of the backlight panel until the next current value is received from the battery charger IC; and
adjusting the current supplied to the power rail to decrease the brightness level of the backlight panel by one step, so that the current detected by the current sensor almost reaches, but does not surpass, the next current value.

17. The method as recited in claim 14, wherein said enabling the system motherboard component or function comprises performing a built-in self-test (BIST) for the display screen.

18. The method as recited in claim 14, wherein said enabling the system motherboard component or function comprises turning on a light emitting diode (LED), a keyboard backlight, a speaker beep, or a power rail under test.

* * * * *